United States Patent
Abel

(10) Patent No.: US 6,749,260 B2
(45) Date of Patent: Jun. 15, 2004

(54) SYSTEM, METHOD AND APPARATUS ADAPTED TO INSTALL A CHILD SAFETY SEAT IN A VEHICLE

(76) Inventor: Kenton B. Abel, 17800 Colima Rd. #254, Rowland Heights, CA (US) 91748

( * ) Notice: Subject to any disclaimer, the term of this patent is extended or adjusted under 35 U.S.C. 154(b) by 0 days.

(21) Appl. No.: 10/314,649

(22) Filed: Dec. 9, 2002

(65) Prior Publication Data

US 2003/0111883 A1 Jun. 19, 2003

Related U.S. Application Data

(60) Provisional application No. 60/339,683, filed on Dec. 12, 2001.

(51) Int. Cl.$^7$ .................................................. A47C 1/08
(52) U.S. Cl. ................. 297/250.1; 297/463.1; 297/463.3; 242/388.3
(58) Field of Search ................... 242/388.3; 297/463.1, 297/463.2, 250.1

(56) References Cited

U.S. PATENT DOCUMENTS

| | | | |
|---|---|---|---|
| 4,604,772 A | | 8/1986 | Arff |
| 4,604,773 A | * | 8/1986 | Weber et al. ............. 242/388.3 |
| 4,822,104 A | * | 4/1989 | Plesniarski ................. 297/468 |
| 4,823,443 A | * | 4/1989 | Waters ..................... 24/68 CD |
| 5,282,296 A | | 2/1994 | Huang |
| 5,462,333 A | | 10/1995 | Beauvais |
| 5,579,561 A | | 12/1996 | Smith et al. |
| 5,611,597 A | * | 3/1997 | Lanz ..................... 297/256.17 |
| 5,733,003 A | | 3/1998 | Goor |
| 5,839,789 A | * | 11/1998 | Koledin ....................... 297/476 |
| 5,842,737 A | | 12/1998 | Goor |
| 5,845,372 A | | 12/1998 | Smith et al. |
| 5,902,015 A | | 5/1999 | Allcock |
| 5,979,982 A | * | 11/1999 | Nakagawa ................ 297/250.1 |
| 6,024,408 A | * | 2/2000 | Bello et al. .............. 297/250.1 |
| 6,033,029 A | * | 3/2000 | Henshall ..................... 297/468 |
| 6,047,451 A | | 4/2000 | Berger et al. |
| 6,081,976 A | | 7/2000 | Nelsen |
| 6,092,869 A | | 7/2000 | Ziv |
| 6,105,211 A | | 8/2000 | Berger |
| 6,183,044 B1 | | 2/2001 | Koyanagi et al. |
| 6,237,999 B1 | | 5/2001 | Hobson |
| 6,241,174 B1 | | 6/2001 | Nelsen et al. |
| 6,247,208 B1 | | 6/2001 | Creech |
| 6,273,353 B1 | | 8/2001 | Berger |
| 6,279,847 B1 | | 8/2001 | Berger |
| 6,322,143 B2 | | 11/2001 | Kassai et al. |
| 2002/0043838 A1 | * | 4/2002 | Yanaka et al. ........... 297/250.1 |

\* cited by examiner

*Primary Examiner*—Peter M. Cuomo
*Assistant Examiner*—Erika Garrett

(57) ABSTRACT

A system adapted to install a child safety seat in a vehicle, comprising a child safety seat, a restraint system; and a tension device; wherein the restraint system includes at least one restraint belt, the restraint belt includes a restraint belt loose end, the tension device is connected to the restraint belt loose end, and, the tension device is adapted to generate tension on the restraint system through the restraint belt loose end to firmly secure the child safety seat with respect to the vehicle.

10 Claims, 8 Drawing Sheets

```
┌─────────────────────────────────┐
│  MOUNT CHILD SAFETY SEAT IN VEHICLE │──50
└─────────────────────────────────┘

┌─────────────────────────────────┐
│  PASS RESTRAINT BELT THROUGH OR OVER │
│  CHILD SAFETY SEAT TO SECURE CHILD SAFETY │──51
│  SEAT TO VEHICLE │
└─────────────────────────────────┘

┌─────────────────────────────────┐
│  BUCKLE THE RESTRAINT BELT BUCKLE │──52
└─────────────────────────────────┘

┌─────────────────────────────────┐
│  ATTACH CHILD SAFETY SEAT INSTALLATION │
│  DEVICE TO RESTRAINT BELT LOOSE END AND │──53
│  TO ANCHOR POINT │
└─────────────────────────────────┘

┌─────────────────────────────────┐
│  REMOVE SLACK IN RESTRAINT BELT BY │
│  GENERATING TENSION FROM TENSION DEVICE │──54
│  ON RESTRAINT BELT LOOSE END │
└─────────────────────────────────┘

┌─────────────────────────────────┐
│  DETACH CHILD SAFETY SEAT INSTALLATION │
│  DEVICE FROM RESTRAINT BELT LOOSE END │──55
│  AND ANCHOR POINT │
└─────────────────────────────────┘
```

*FIG. 5*

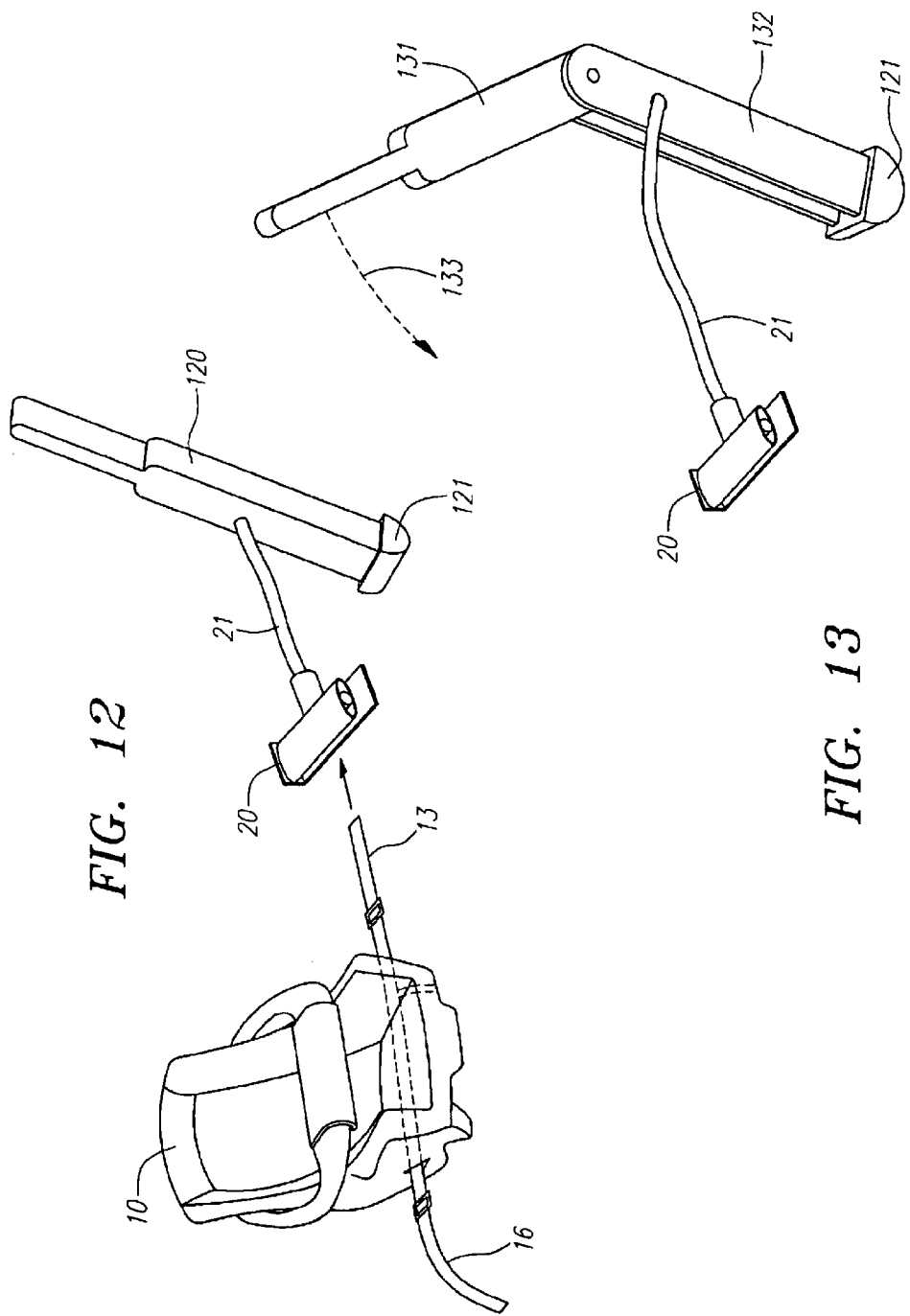

SYSTEM, METHOD AND APPARATUS ADAPTED TO INSTALL A CHILD SAFETY SEAT IN A VEHICLE

CROSS-REFERENCE TO RELATED APPLICATION

The present application claims priority under 35 U.S.C. §119(e) to U.S. Provisional Application No. 60/339,683, filed on Dec. 12, 2001, which is expressly incorporated by reference as though fully set forth herein.

FIELD OF THE INVENTION

The present invention relates to installation of a child safety seat, and in particular to a System, Method and Apparatus Adapted to Install a Child Safety Seat in a Vehicle.

BACKGROUND OF THE INVENTION

The field of the invention pertains to the installation of child safety seats in vehicles. The National Safety Belt Coalition reports that experts estimated that 80% to 90% of child safety seats are installed and/or used incorrectly in automobiles. As a result, every year many children are needlessly injured or killed during otherwise minor vehicular accidents because of the incorrect installation of the child's safety seat.

Belts are commonly employed in vehicles to secure a child's safety seat to the supporting vehicle seat. While belts are effective for security, as noted above they usually suffer from the disadvantage of having unwanted slack from incorrect installation. Slack in a belt decreases the effectiveness of the belt's ability to secure and retain the child safety seat in place. An incorrectly installed child safety seat can be more dangerous to the child than no safety seat at all.

The law in many jurisdictions requires that all young children be secured in a child safety seat while travelling in an automobile. In some jurisdictions, car rental companies are required to temporarily secure a child safety seat in a rented car when the renter has a young child. The seat must be belted down so as to prevent any movement of the child safety seat relative to the automobile seat on which it is mounted. This requires that the installer exert a high degree of force on the child safety seat as it is being strapped in. Unfortunately, even the best efforts of the installer often fail and the child safety seat still has a degree of movement in the event of an accident.

There have been attempts to reduce or eliminate the inherent problem of slack in belts for retaining child safety seats. These devices often come in the form of clamping means or tightening and adjusting means with a mechanical assembly that engages a portion of the strap or, alternatively, two separate portions of the strap. Many of these devices, however, require that at least one end of the strap be passed through the device after the device is attached to another portion of the strap.

Belt shortening devices are disclosed in U.S. Pat. Nos. 6,047,451; 6,081,976; 6,105,211; 6,241,174; 6,273,353; 6,279,847 and 4,604,773, herein incorporated by reference. These devices attach to a section of a belt and remove slack by winding the belt around a ratchet mechanism.

A belt tensioning device is also disclosed in U.S. Pat. No. 4,604,772, herein incorporated by reference. This device is comprised of two pieces of plastic pivotally connected together, such that clamping the two pieces together will result in a short belt length.

Many devices commonly require that a loose end of the belt be routed through the device to enable winding of the belt by the device to effectuate shortening. As can be understood, the foregoing devices are unsuitable for shortening vehicle seat belts because the belts are not capable of being routed onto commonly available ratchet take-up mechanism due to the presence of bulky buckles, both male and female endings, present on the loose ends of the belts. Other devices permanently incorporate the ratchet take-up mechanism directly on the belt itself.

Other belt tightening devices are disclosed in U.S. Pat. Nos. 6,092,869 and 6,247,208, herein incorporated by reference. These devices are adapted to be attached to a belt at a point along its length to take up slack.

Another approach to installation of a child safety seat is taught in U.S. Pat. No. 6,024,408, incorporated herein by reference. This approach involves a device that sits over the child safety seat and applies downward pressure generated by a lever. The installer tightens the seat belt that passes through the child safety seat while the child safety seat is pressed into the car seat. This device is bulky and poor access to the belt buckle may result is an incorrect installation.

A seat belt gripping device for use with seat belts with lap and shoulder portions is disclosed in U.S. Pat. Nos. 5,579,561 and 5,845,372, herein incorporated by reference. Another seat belt gripping device is disclosed in U.S. Pat. No. 5,902,015, herein incorporated by reference. These devices secure the lap belt portion and shoulder belt portion together after installation of the child safety seat. These devices maintain the tension present in the restraint system at the time they are installed.

A ratchet mechanism is disclosed in U.S. Pat. No. 5,282,296, herein incorporated by reference. This type of a tension device is commonly used to secure loads onto trucks or on top of automobiles.

A few examples of child safety seats are disclosed in U.S. Pat. Nos. 6,322,143; 6,237,999; 6,183,044; 5,842,737; 5,733,003; 5,462,333, each incorporated by reference herein.

In view of the foregoing, there is a demand for an apparatus and method for installing a child safety seat securely in relation to a vehicle. There is also a need for child safety seat installation methods and devices that are compact, inexpensive, easy to use, and can be used in a variety of vehicle types and vehicles models with a variety of child safety seat models.

SUMMARY OF PREFERRED EMBODIMENTS

An aspect of the present invention provides a method adapted to install a child safety seat in a vehicle by generating tension on a loose end of the restraint belt with a tension device.

Another aspect of the present invention provides a system adapted to install a child safety seat in a vehicle. A tension device is adapted to generate tension on a loose end of a restraint belt to firmly secure the child safety seat with respect to the vehicle.

Another aspect of the present invention provides a child safety seat installation device comprising a clamp to grip a restraint belt loose end and a tension device with a mechanical advantage greater than 1, wherein tension device adapted to generate tension on the restraint belt loose end to firmly secure the child safety seat with respect to the vehicle.

BRIEF DESCRIPTION OF DRAWINGS

The following discussion may be best understood with reference to the various views of the drawings, described in summary below, which form a part of this disclosure.

FIG. 5 is a block diagram of methods of child safety seat instillation according to preferred implementations of the present invention.

FIG. 12 is a perspective view of child safety seat installation system using a lever-type tension device.

FIG. 13 is a perspective view of a lever-type tension device.

DETAILED DESCRIPTION OF THE PREFERRED EMBODIMENTS

Figure 1:
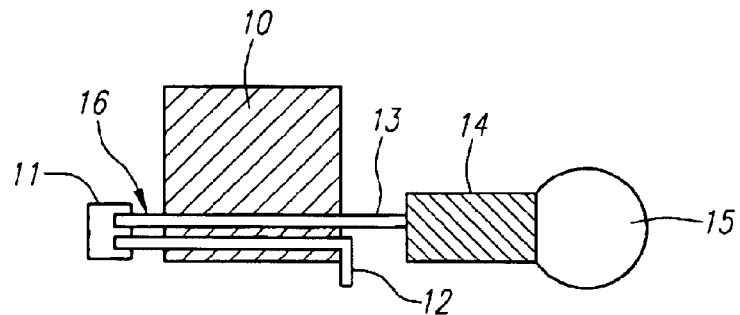
FIG. 1 is a block diagram view of a preferred implementation of a child safety seat installation system.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided as illustrations so that this disclosure will be thorough and complete, and will fully convey the scope of the invention to those skilled in the art. Like numbers refer to like elements throughout all drawings.

It will be understood that when an element is referred to as being "connected to" another element, it can be directly connected to the other element or intervening elements may also be present. In contrast, when an element is referred to as being "directly connected to" another element, there are no intervening elements present. When an element is referred to as being "adjacent" another element, it can be near the other element but not necessarily independent of the other element. When an element is referred to as being "between" two things, it can be either partly or completely between those two things, but is not necessarily completely and continuously between those two things. The term "adapted to" should be construed to mean "capable of".

The term "device" can refer to an object, apparatus, and/or machine.

The term "restraint system" can refer to a system that can restrain movement of an occupant or object of a vehicle. Restraint systems in automobiles can, for example, include seat belts and belt buckles. The seat belts typically include at least one end connected to the vehicle. Lap belt style seat belts include a loose end used to tighten the restraint belt.

The term "restraint belt" can include seat belts, as well as other securing materials such as straps, rope, cables, etc.

The term "loose end" of a belt can refer to a portion of the restraint belt in a lap-style belt that is not secured to the vehicle. Commonly available belt buckles for lap belts may be designed so that when the loose end of the belt is pulled, the belt tightens. In a restraint belt with a shoulder portion and a lap portion, the shoulder portion is commonly the "loose end" of the belt. One end of the lap portion is usually fixedly secured to the vehicle.

The term "anchor point" can refer to any object that is capable of providing an anchor for a tension device. The tension device acts upon an object. When a restraint belt is tightened, the anchor point provide an opposite reaction to the tension placed upon the loose end of the seat belt. Although the anchor point will most commonly be stationary relative to the child safety seat, the anchor point does not necessarily need to be stationary, provided that for every action the anchor point can provide an opposite reaction when the tension device tighten the restraint belt. Examples for suitable anchor points include the latch of a vehicle door, a neighboring restraint belt, the secured end of the restraint belt being tightened, the child safety seat being secured, a fixed anchor point outside the vehicle such as a tree, etc. The tension device may exert either tensional force upon the anchor point (for example, a pulley-type tension device), or compression force upon the anchor point (for example, a lever-type tension device). One or ordinary skill in the art will recognize that a variety of anchor points will be suitable to practice aspects of the present invention.

The term "tension" refers to a pulling force upon an object. It is well understood that when the tension of a restraint belt is increased during installation of a child safety seat, the child safety seat will be secured more firmly with respect to the vehicle seat. One of the current problems in the installation of a majority of child safety seats is the seat belt is not placed under adequate tension to prevent significant movement of the child safety seat in the event of an accident.

The term "tension device" includes any device that has a mechanical advantage greater than 1.0 to put tension on an object. As detailed in many textbooks of high school physics, tension devices can be either dependent upon vector resolution, (e.g., screw,) or one in which there is an equilibrium of torques, (e.g., lever, pulley, wheel-and-axle). The mechanical advantage is ideally the ratio of the force exerted by the device to the force acting upon it. Ordinarily a more practical measure of the mechanical advantage of a device is the ratio of the displacement produced by the operator of the device to the resulting displacement of the load by the device. For example, if the handle of an automobile jack is move 5" in lifting a car 0.01", the mechanical advantage is 500. If one end of a lever is moved 6" and the other end moves an object 3", the mechanical advantage is 2.0.

Tension devices can include, but not be limited to, ratcheting-type mechanisms, pulley-type mechanisms, lever-type mechanisms, gear-type mechanisms, screw-type mechanisms, wheel-and-axle type mechanisms, etc. While tension devices detailed herein are mechanical devices, it should be understood that tension devices can also include electrical devices, pneumatic devices, motor devices, etc.

The term "point of application" is the point where a force is applied to an object.

The term "flexible member" can include, but are not limited to, belts, straps, ropes, wires, chains, cords, cables, string, twine, etc.

Attachment devices can include, but are not limited to: alligator type clamps; hooks; a snap-type clamps; buckles (such as a male portion of a seat belt buckle attached to a female portion of a neighboring seat belt buckle); bars; sticks; securing a rope or belt to an object by tying a knot; a spring-loaded cam-type device; a cleat-type clamp; etc. One or ordinary skill in the art will recognize that a variety of things may be used for attachment devices and still practice aspects of the present invention.

The term "vehicle" can include automobiles, airplanes, boats, buses, trains, and other modes of transportation wherein a child safety seat may be secured relative to the vehicle.

Vehicle seat belts are typically designed so that belt may be tighten by pulling on the loose end of the belt. In many seat belt buckles, the belt will only pass in one direction through the buckle, thus maintaining the tension of the belt. Conventional systems of child safety seat installation fail to tighten a restraint belt by pulling on a restraint belt loose end with a tension device.

In reference to FIG. 1, child safety seat 10 is mounted in a vehicle (not shown). Belt buckle 11 is connected to the vehicle. Restraint belt 16 passes through belt buckle 11, and the restraint belt secure end 12 connects to the vehicle and restraint belt loose end 13 does not directly connected to the vehicle. A first end of tension device 14 connects to restraint belt loose end 13. A second end of tension device 14 connects to anchor point 15. Tension is generated on restraint belt loose end 13 by tension device 14, securing child safety seat 10 relative to the vehicle.

Figure 2:
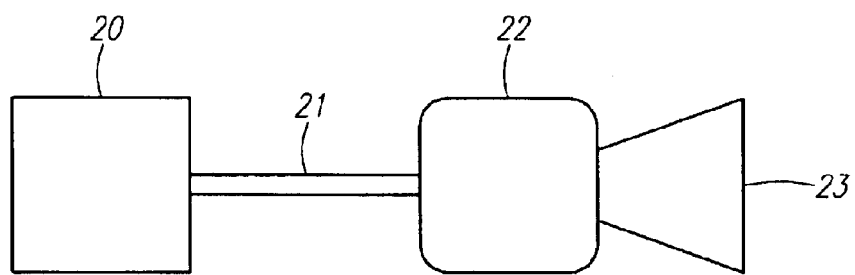
FIG. 2 is a block diagram view of a preferred implementation of a child safety seat installation device.

In reference to FIG. 2, first attachment device 20 is adapted to grip the restraint belt loose end 13. Child safety seat installation device flexible member 21 is connected to first attachment device 20 and tension device 22. Second attachment device 23 is adapted to connect to anchor point 15. Second attachment device 23 is either directly or indirectly connected to tension device 22.

Figure 3:
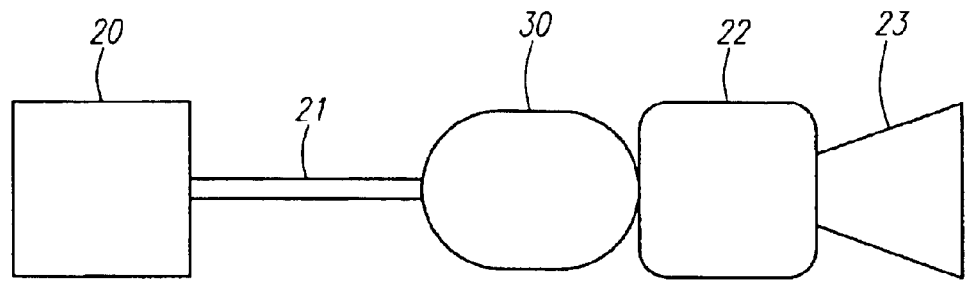
FIG. 3 is a block diagram view of another implementation of a child safety seat installation device.

In reference to FIG. 3, tension-measuring device 30 is connected to tension device 22. Tension-measuring device 30 is adapted to measure tension generated upon first attachment device 20. As such, tension-measuring device 30 may be connected anywhere between first attachment device 20 and second attachment device 23.

Figure 4:
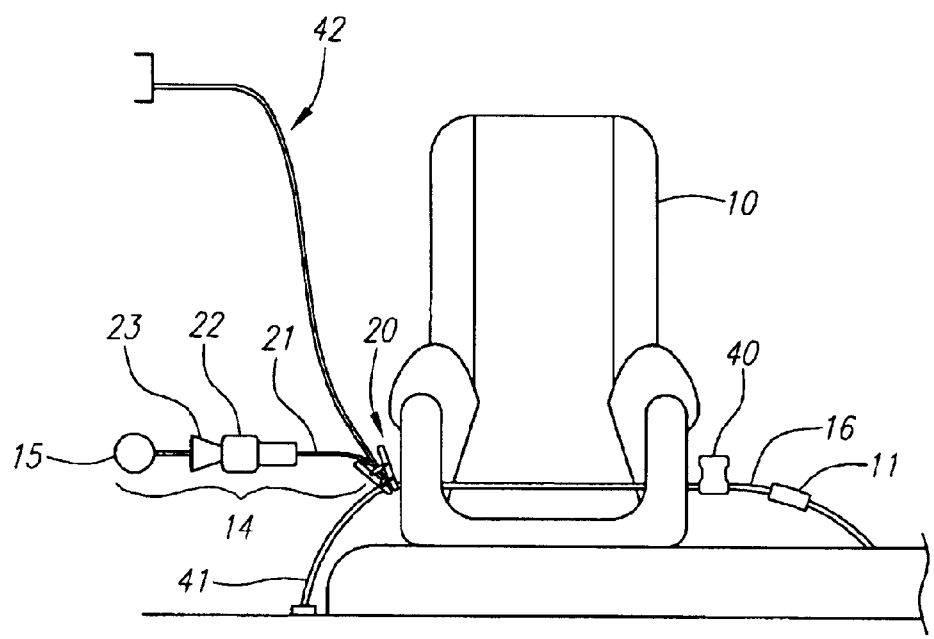
FIG. 4 is a perspective view showing the child safety seat installation system, wherein the restraint belt includes both lap and shoulder portions.

In reference to FIG. 4, restraint belt 16 includes a lap portion 41 and a shoulder portion 42. First attachment device 20 grips restraint belt shoulder portion 42 instead of restraint belt loose end 13. Restraint belt gripping device 40 maintains tension in restraint belt lap portion 41 by locking lap belt portion 41 to shoulder portion 42. Depending upon the design of restraint belt gripping device 40, tension may need to be generated by child safety seat installation device 14 and maintained until restraint belt gripping device 40 is secured. In the implementation shown in FIG. 4, first attachment device 20 is an alligator-type clamp and second attachment device 23 includes belt portion and a hook.

FIG. 5 generally refers to a method adapted to install a child safety seat in a vehicle. Child safety seat 10 is mounted in the vehicle, preferably in the middle of the back seat in a automobile. Block 50. Restraint belt 16 is passed through child safety seat 10 to secure it to the vehicle, in accordance with the child safety seat manufacturer's instructions. In a few designs, restraint belt 16 will be passed over child safety seat 10 to secure it to the vehicle. Block 51. The male and female portions of the restraint belt buckle 11 are fastened together. Block 52. (Some slack in restraint belt 16 may optionally be removed by the installer, wherein the installer holds onto restraint belt loose end 13 and pulls. However, most people will never be able to adequately secure a child safety seat to a vehicle through the use of "elbow grease." Specifically, even when a large male pulls as hard as he can on the loose end of a seat belt, enough slack remains in the seat belt such that the child safety seat will move a significant distance during an accident. Such movement during an accident increases the chances of injury or death to the child. Part of the reason why 80% of child safety seats are not installed correctly is that people mistakenly believe that the child safety seat can be installed simply by using one's arms to secure the child safety seat.) After restraint belt buckle 11 is fastened, child safety seat installation device 14 is attached to restraint belt loose end 13 and the anchor point 15. Block 53. Child safety seat installation device 14 includes tension device 22. Tension device 22 generates tension on restraint belt loose end 13, securing child safety seat 10 to the vehicle. Block 54. If child safety seat installation device 14 includes tension-measuring device 30, tension device 14 generates tension until a minimum amount of tension is applied to restraint belt loose end 13. The specific amount of tension applied to restraint belt loose end 13 to firmly install a child safety seat will vary between vehicle models, vehicle seat models, restraint belt models, and restraint belt buckle models, as well as other factors. After sufficient tension in generated to firmly secure child safety seat 10 to the vehicle, child safety seat installation device 14 is preferably detached from restraint belt loose end 13 and anchor point 15. Block 55. The tension in restraint belt 16 is maintained by belt buckle 11.

If the restraint belt includes shoulder portion 42 and a lap portion 41, shoulder portion 42 is attached to child safety seat installation device 14 instead of restraint belt loose end 13. Tension is generated upon lap portion 41 by applying tension to shoulder portion 42. Depending upon the design of restraint belt gripping device 40, tension may need to be maintained by child safety seat installation device 14 until restraint belt gripping device 40 is secured.

Figure 6:
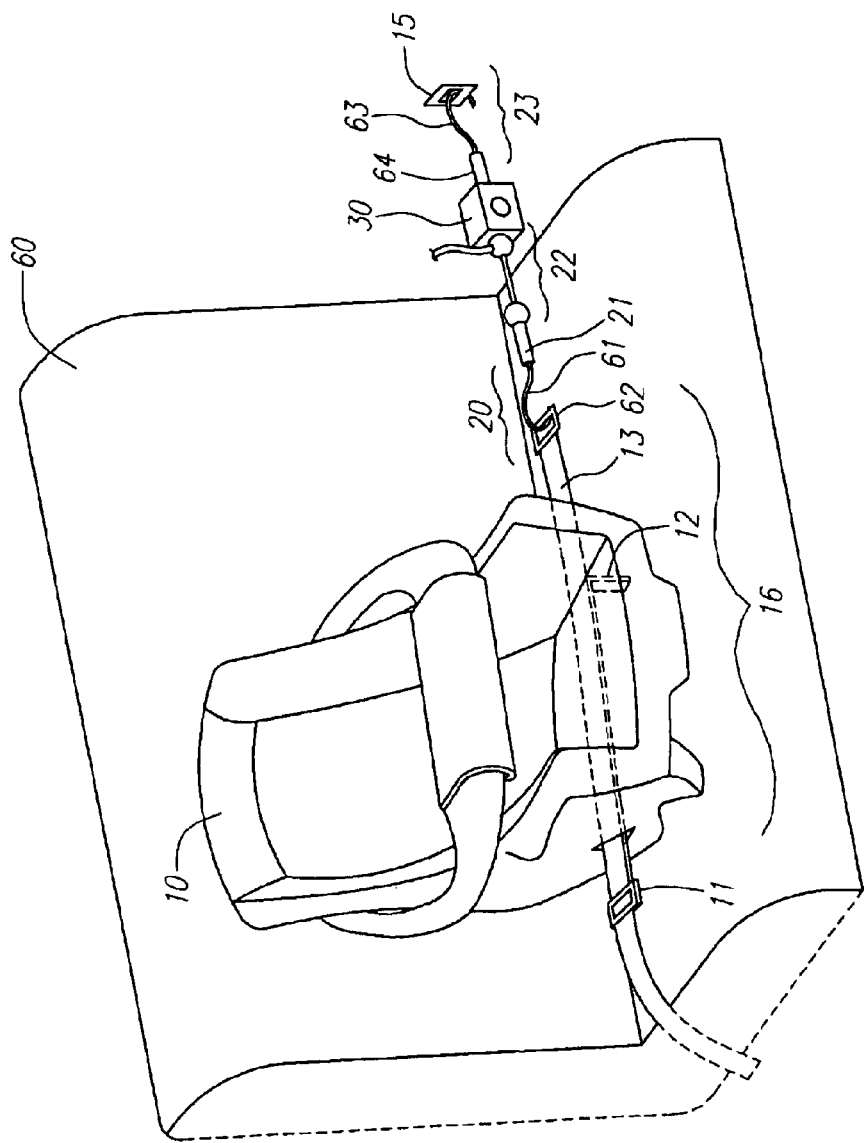
FIG. 6 is a perspective view showing the child safety seat installation.

In reference to FIG. 6, child safety seat is mounted on vehicle seat 60. In the implementation shown in FIG. 6, tension-measuring device 30 is connected between tension device 22 and second attachment device 23. Also in the implementation shown in FIG. 6, first attachment device 20 includes hook 61 and U-bolt 62. U-bolt 62 is connected to the end of restraint belt loose end 13. Tension device 22 is a pulley-type device, and second attachment device 23 includes a belt portion 63 and a hook 64.

Figure 7:
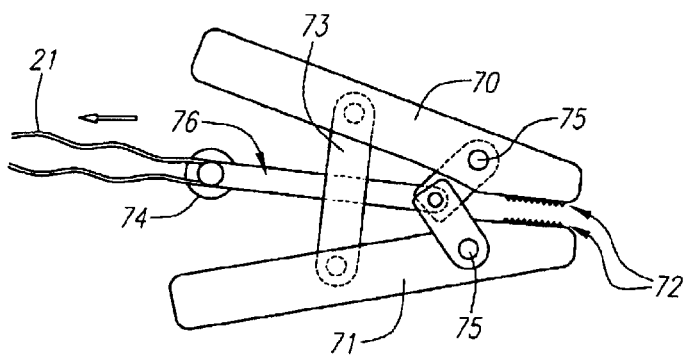
FIG. 7 is a side plan view of one example of an alligator-type clamp.

In reference to FIG. 7, one example an alligator-type clamp adapted to grip a restraint belt. Top member 70 and a bottom member 71 are connected by fulcrum 73. Teeth 72 are adapted to grip the restraint belt without slipping. Flexible member 21 is connected to the alligator-type clamp at attachment device 74. When tension is applied from belt 21, member 76 transmits the tensional force to top member 70 and bottom member 71 via members 75, gripping the restraint belt with teeth 72.

Figure 8:
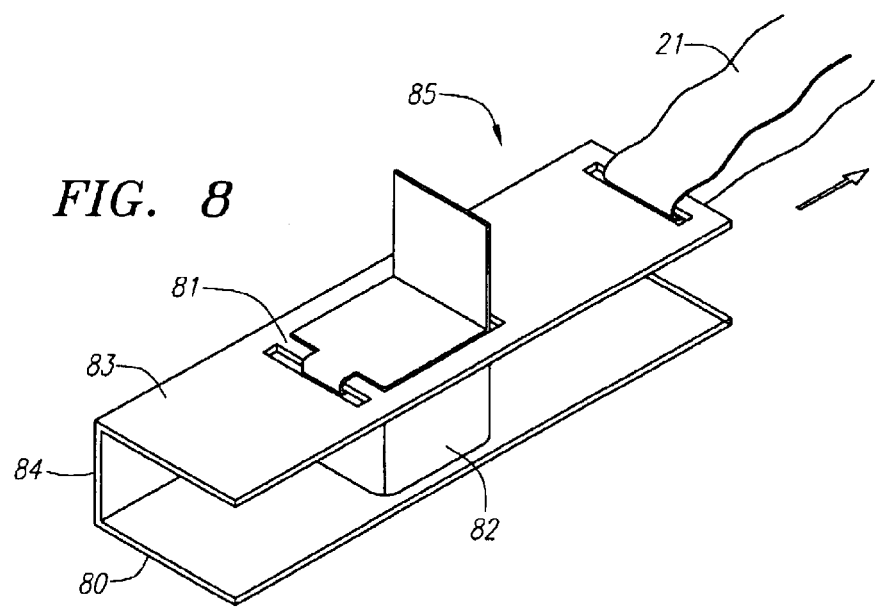
FIG. 8 is a perspective view of one example of a cleat-type clamp.

In reference to FIG. 8, a cleat-type clamp includes a C-bracket 85 and a cleat 82. C-bracket 85 includes a top bracket portion 83, a bottom bracket portion 80, and a side bracket portion 84. Cleat 82 is attached to C-bracket 85 through bar 81. Restraint belt loose end 13 is placed between bottom bracket portion 80 and cleat 82. Tensional force transmitted through flexible member 21 causes cleat 82 to press restraint belt loose end 13 against bottom bracket portion 80, securely gripping restraint belt loose end 13 while the tensional force is maintained.

Figure 9:
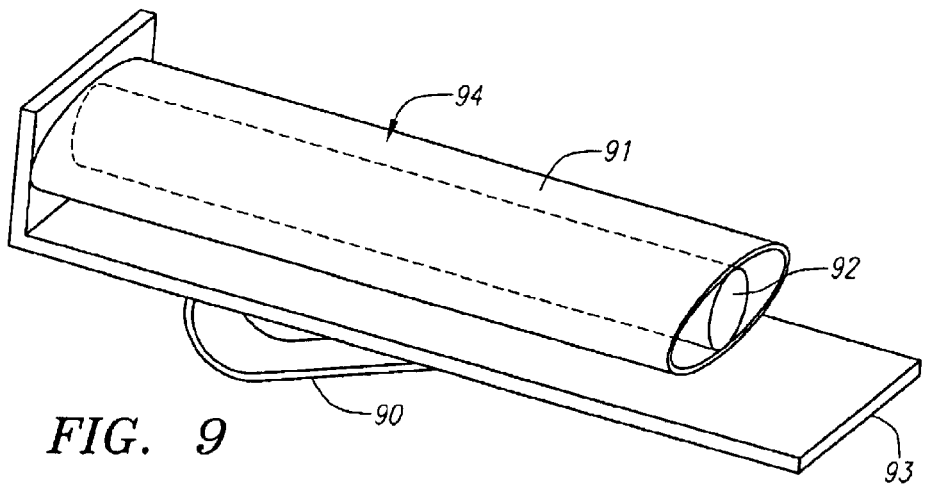
FIG. 9 is a perspective view of a second example of a cleat-type clamp.

In reference to FIG. 9, a cleat-type clamp 94 includes an attachment device 90, a cleat 91, a cleat-support device 92, and a plate 93. The cleat-support device 92 attaches to plate 93 on one end of cleat 91. Restraint belt loose end 13 (not shown) is placed between bottom plate 93 and cleat 91. Tensional force transmitted through attachment device 90 causes cleat 91 to press restraint belt loose end 13 against plate 93, securely gripping restraint belt loose end 13 while the tensional force is maintained.

Figure 10A:
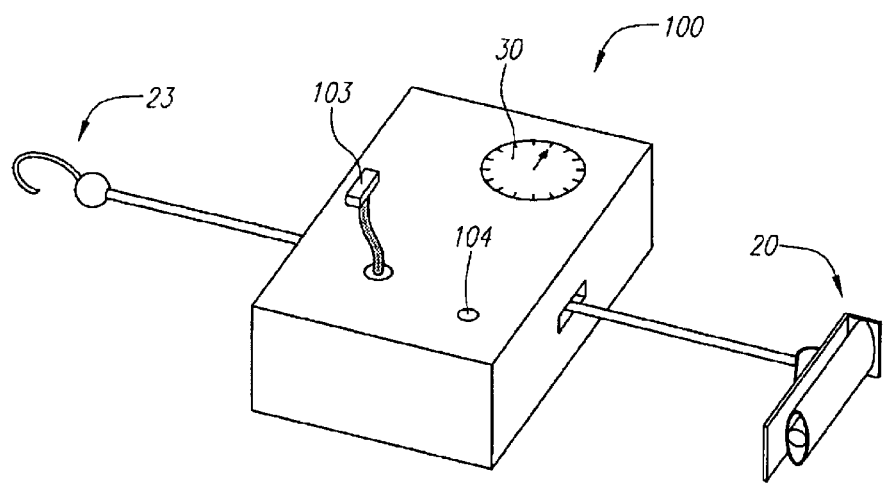
FIG. 10 is a perspective view of a gear-type tension device.
Figure 10B:
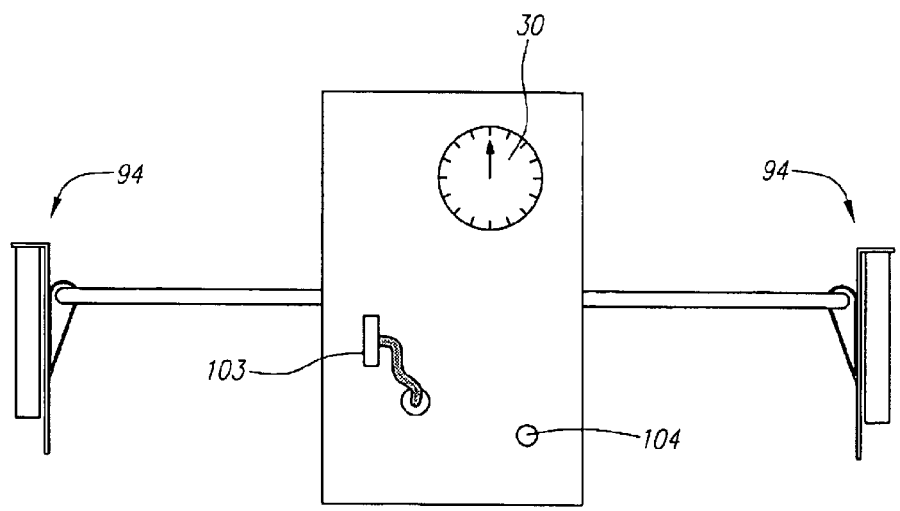

In reference to FIG. 10, gear-type tension device 100 includes first attachment device 20, a second attachment device 23, a tension-measuring device 30, a pull-cord 103, and optionally tension-releasing button 104. As described above for FIG. 2 and FIG. 3, first attachment device 20 is adapted to grip the restraint belt loose end 13. Child safety seat installation device flexible member 21 (not shown) is connected to first attachment device 20 and gear-type tension device 100. Second attachment device 23 is adapted to connect to anchor point 15 (not shown). Second attachment device 23 is either directly or indirectly connected to gear-type tension device 100. Tension is generated on restraint belt loose end 13 by pulling on pull-cord 103. Gear-type tension device may optionally include tension-releasing button 104, such that tension is maintained on restraint belt loose end 13 until one activates tension-releasing button 104. As shown in FIG. 10b, both first attachment device 20 and second attachment device 23 may be adapted to grip restraint belts, in this example a cleat-type attachment device 94.

Figure 11:
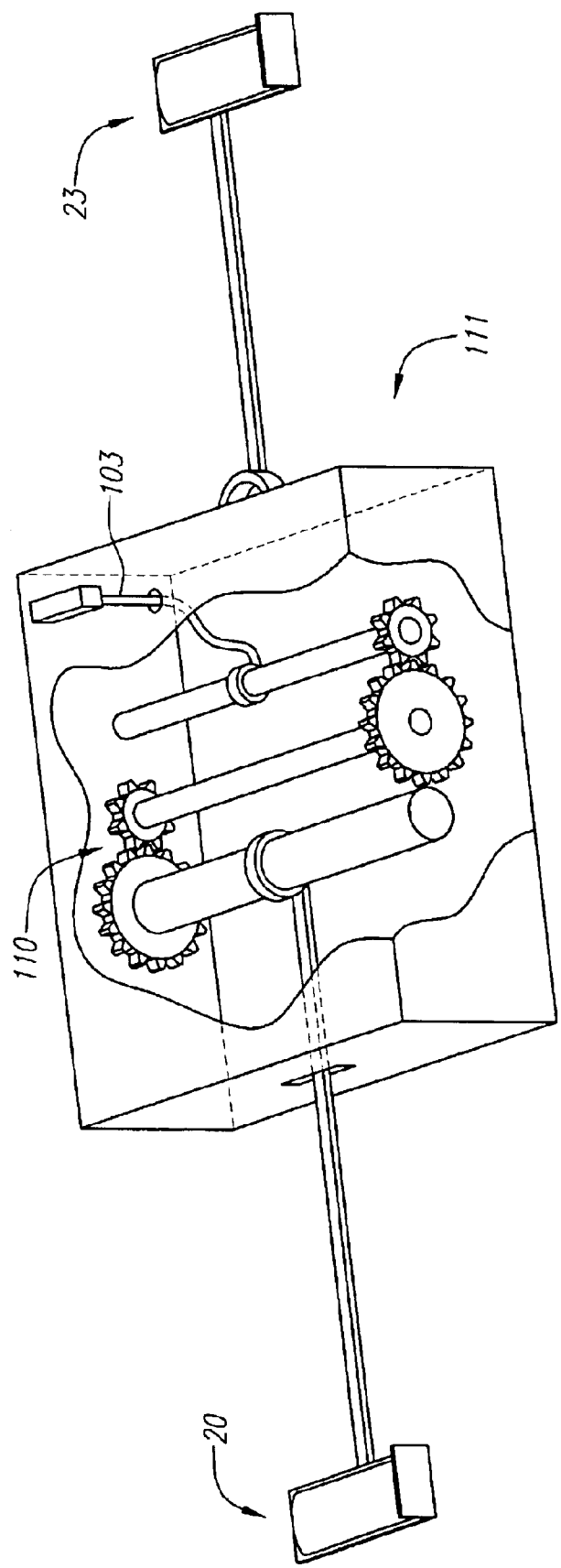
FIG. 11 is an illustrative a cut away view of a gear-type tension device.

In reference to FIG. 11, gear-type tension device 111 includes first attachment device 20, a second attachment device 23, a pull-cord 103, and gears 110. Tension is generated on restraint belt loose end 13 (not shown) by pulling on pull-cord 103.

In a preferred implementation of the method of the current invention, a first end of a tension device is either directly or indirectly connected to the loose end of the lap belt style seat belt. The second end of the tension device is connected to an object that is fixed relative to the first end of the tension device. The child safety seat is secured to the vehicle seat by applying tension on the seat belt through the tension device. When the child safety seat is sufficiently secured to the seat, the tension device is uncoupled from both the seat belt and the anchor point.

In reference to FIG. 12, child safety seat 10 is secured to the vehicle by means of restraint belt 16. Attachment device 20 attaches to restraint belt loose end 13, and tension is generated on the restraint belt loose end 13 through flexible member 21 by level 120. Lever base 121 acts as the anchor point by pushing against the vehicle seat, the child safety seat, or the like.

In reference to FIG. 13, a compactable lever device is illustrated. Attachment device 20 attaches to flexible member 21, and flexible member 21 attaches to lower lever portion 132. Tension is generated by pulling on upper lever portion 131 when the lever device is fully extended. For storage, upper lever portion 131 can fold next to lower lever portion 132, as illustrated by arrow 133.

In another implementation of the method of the current invention, a child safety seat is installed using a seat belt has a shoulder portion and a connected lap portion. The first end of the tension device is either directly or indirectly connected to the shoulder portion of a seat belt. The second end of the tension device is connected to an anchor point. The child safety seat is secured to the vehicle seat by generating tension on the shoulder portion of the seat belt with the tension device. When the child safety seat is sufficiently secured to the seat, a seat belt clamp is installed near the belt buckle to attach the lap belt portion of the belt to the shoulder belt portion, thus maintaining the tension on the lap belt portion after the tension device is uncoupled from both the seat belt and the anchor point. Alternatively, a seat belt clamping device that allows for one way movement of the shoulder portion (in a similar manner to the male portion of a lap belt buckle) is installed prior to generating tension with the tension device.

In another implementation of the present invention, a child safety seat installation device and method are disclosed. A ratchet is used as the tension device. A first belt is attached to the tension device and attached to the restraint belt loose end. The attachment may be via an alligator-type clamp, a cleat-type clamp, or other attachment device. The second end of the tightening belt has an alligator type clamp or other attachment means for attaching to an anchor point, such as a neighboring seat belt. The tension device is used to pull on the loose end of the car seat belt until the desired tension in the restraint system is achieved to secure the child safety seat to the vehicle. The tension device is uncoupled from both the seat belt and the anchor point. The child safety seat installation device may easily be stored until the next time the child safety seat needs to be installed. The tension securing the child safety seat to the vehicle is maintained by the belt buckle. One example of a ratchet device is Ratchet Tie-Down, Part No. 85513 sold by Keeper Corporation, 6 Industrial Park Drive, N. Windham, Conn., 06256.

In another implementation of the present invention, the tension device is attached to a first hook and a second hook. A U-bolt is attached to a loop at the end of the restraint belt loose end and secured with a metal plate and nuts. The first hook is attached to the U-bolt. The second hook is connected to the car frame at the door lock, or other anchor point. The tension device is used to generate a tension on the loose end of the seat belt until the child safety seat is sufficiently secured relative to the vehicle. The hooks and the child safety seat installation device are uncoupled from the restraint belt loose end and the anchor point.

While the present invention has been described in terms of certain preferred implementations, those of ordinary skill in the will appreciate that certain variations, extensions and modifications may be made without varying from the basic teachings of the present invention. As such, the present invention is not to be limited to the specific preferred implementations described herein. Rather, the scope of the present invention is to be determined from the claims, which follow.

What is claimed:

1. A system adapted to install a child safety seat in a vehicle, comprising: a child safety seat, a restraint system, and a tension device; wherein the restraint system includes a restraint belt loose end, wherein the tension device is connected to the restraint belt loose end, and, wherein the tension device is adapted to generate tension on the restraint system through the restraint belt loose end to firmly secure the child safety seat with respect to the vehicle; an anchor point; wherein the restraint system is adapted to secure the child safety seat with respect to the vehicle, wherein the restraint system includes at least on restraint belt and at least one belt buckle, wherein the restraint belt includes the restraint belt loose end and a restraint belt secure end, the restraint belt secure end is connected to the vehicle, wherein the tension device is connected to the restraint belt loose end, wherein the anchor point is connected to the tension device; a tension-measuring device; wherein the tension-measuring device is connected to the tension device; and, wherein the tension-measuring device is adapted to measure the tension on the restraint belt loose end, whereby the tension-measuring device will provide an indication that a predetermined minimum amount of tension has been generated on the restraint belt loose end and/or the tension-measuring device will provide a numerical measurement of the of tension generated on the restraint belt loose end.

2. The system of claim 1, wherein the tension device is selected from the group consisting of a pulley-type device, a gear-type device, and a lever-type device.

3. The system of claim 2: wherein the tension device is adapted to apply a mechanical advantage greater than 3.0.

4. A method adapted to install a child safety seat in a vehicle, comprising: connecting a tension device to a restraint belt loose end; mounting a child safety seat in a vehicle, wherein the vehicle includes a restraint belt and belt buckle; passing the restraint belt through the child safety seat to secure the child safety seat to the vehicle; buckling the belt buckle; connecting a tension device to a restraint belt loose end; connecting the tension device to an anchor point; generating tension on the restraint belt loose end by the tension device, wherein the restraint belt secures the child safety seat relative to the vehicle; and, wherein a tension-measuring device is connected to the tension device; wherein the tension-measuring device is adapted to measure the tension on the restraint belt loose end, whereby the tension-measuring device will provide an indication that a predetermined minimum amount of tension has been generated on the restraint belt loose end and/or the tension-measuring device will provide a numerical measurement of the of tension generated on the restraint belt loose end.

5. The method of claim 4, wherein the restraint belt loose end is connected to the tension device with a clamp.

6. The method of claim 4, wherein the tension generated on the loose end of the belt is at least 75 kg/165 lbs. tensional force.

7. The method of claim 4, wherein the tension generated on the loose end of the belt is at least 150 kg/330 lbs. tensional force.

8. A child safety seat installation device comprising: a first attachment device adapted to grip a restraint belt loose end; a flexible member; a tension device; and an anchor device adapted to connect to an anchor point; wherein the flexible member has a flexible member first end and a flexible member second end; wherein the first attachment device is connected to the flexible member first end; wherein the tension device is connected to the flexible member second end; wherein the anchor device is connected to the tension device; and wherein the tension device is adapted to generate tension on the restraint belt loose end; and, a tension-measuring device; wherein the tension-measuring device is connected to the tension device, and, wherein the tension-measuring device is adapted to measure the tension generated on the first attachment device, whereby the tension-measuring device will provide an indication that a predetermined minimum amount of tension has been generated on the belt loose end and/or the tension-measuring device will provide a numerical measurement of the of tension generated on the restraint belt loose end.

9. The device of claim 8 wherein the tension-measuring device is directly connected to the tension device.

10. The device of claim 8 wherein the tension device is selected from the group consisting of a pulley-type device; a gear-type device, and a lever-type device.

* * * * *